United States Patent [19]

Jelalian et al.

[11] 4,167,329

[45] Sep. 11, 1979

[54] FOCUSSED DOPPLER RADAR

[75] Inventors: Albert V. Jelalian, Bedford; Charles M. Sonnenschein, Brookline; Wayne H. Keene, Medfield, all of Mass.

[73] Assignee: Raytheon Company, Lexington, Mass.

[21] Appl. No.: 859,904

[22] Filed: Dec. 12, 1977

[51] Int. Cl.² .......................... G01C 3/08; G01P 3/36
[52] U.S. Cl. ........................................ 356/5; 356/28.5
[58] Field of Search ............................ 356/5, 28, 28.5

[56] References Cited

U.S. PATENT DOCUMENTS

| | | | |
|---|---|---|---|
| 3,271,763 | 9/1966 | Colby, Jr. ........................ 343/12 A |
| 3,528,741 | 9/1970 | Benson et al. ........................ 356/28 |
| 3,689,156 | 9/1972 | Kerpchar ........................ 356/5 |
| 3,738,750 | 6/1973 | Kalb et al. ........................ 356/28 |
| 3,856,402 | 12/1974 | Low et al. ........................ 356/5 |
| 3,984,685 | 10/1976 | Fletcher et al. ........................ 356/28 |

*Primary Examiner*—S. C. Buczinski
*Attorney, Agent, or Firm*—David M. Warren; Joseph D. Pannone; Milton D. Bartlett

[57] ABSTRACT

An optically focussed laser radar operating with a radiation wavelength of typically ten microns is focussed on an object to be observed. Doppler data is obtained with a continuous wave signal by mixing a reference of the transmitted signal with a signal reflected from airborne scattering centers. The system is particularly useful for clear air turbulence applications wherein aerosols such as dust and pollen serve as the scattering centers for reflecting the radiation. The radar converts to a pulse Doppler system when the depth of field exceeds the desired range resolution.

13 Claims, 6 Drawing Figures

FOCUSSED DOPPLER RADAR

BACKGROUND OF THE INVENTION

Radar and sonar systems are frequently utilized for measuring the distance between scatterers or reflectors of radiant energy as well as for measuring the radial components of the velocities of the scatterers or reflectors by means of Doppler frequency shifts. These measurements may be obtained with either electromagnetic radiation or sonic radiation. While various wavelengths and modulation patterns are selected for particular situations, in the case of measurements of clear air turbulence, electromagnetic radiation having a wavelength on the order of ten microns, such as is provided by a carbon dioxide laser, is preferred. Such lasers are operated either on a continuous wave (cw) or pulsed basis.

A problem arises when it is desired to obtain good range resolution and good Doppler resolution at close range. As is well known, a precise Doppler measurement requires a cw signal, or at least a long pulse signal. In contrast, good range resolution by a pulsed laser radar requires the use of relatively short pulses. At moderate ranges, a compromise can usually be reached wherein the length of the laser pulse signal is adequately long to achieve good Doppler measurements while still being sufficiently short to permit good range measurements. However, at very short ranges, such as one thousand feet, even a reasonably short laser pulse signal would have a duration longer than the round trip propagation time from the radar to the reflector and back to the radar. The existence of the transmitted and received signal pulses simultaneously at the radar precludes or greatly degrades a range measurement at the short ranges. This problem is particularly acute for measurements in the vicinity of an airport runway since such measurements may well fall within the aforementioned one thousand foot range.

SUMMARY OF THE INVENTION

The aforementioned problem is overcome and other advantages are provided by a radar system which, in accordance with the invention, combines a laser with an optical focussing system wherein a variable focus is produced so that the radiation from the laser can be focussed at varying distances from the radar, the depth of field of the focus determining the range resolution element or range cell while the distance of the focus determines the range of the scattering center or reflector. Thereby, at close-in ranges, such as the aforementioned one thousand foot region in front of the radar, the radar is able to operate with a cw signal which provides excellent Doppler resolution independently of the range measurements, the range measurements being accomplished by the focussing of the laser beam. Since the depth of field is a function of the focal length or range to which the radar is focussed, the range resolution element or range cell increases in size for increasing values of the focal range. Accordingly, the invention includes circuitry for providing a transition from the cw signal to a pulsed signal for use at longer ranges wherein the range resolution capability of the pulsed signal exceeds that of the cw signal.

The optical radar system of the invention further comprises circuitry for the measurement of the radial component of the velocity of the aerosol scatterers and, hence, the radial component of the velocity of the air which carries the scatterers. The velocity data is obtained from a measurement of the Doppler frequency shift induced upon the light reflected by the moving scatterers. An interferometer combines signals reflected back to the radar with a reference beam and a detector produces the difference or beat frequency signal. The beat frequency is equal to the Doppler shift. A comb filter circuit is disclosed for extracting numerical values of the Doppler frequency and velocity from the beat frequency signal. The transmitted light beam may also be scanned by a mirror to provide directional data of the scatterers.

It is interesting to note distinctions between the instant optical radar and that of a conventional radar, such as a radar operating at a frequency of from one to ten gigahertz, with respect to a pulsed Doppler mode of operation. The instant radar is concerned with range and velocity measurement of aerosols. The aerosols are objects such as pollen or dust such as, for example, volcanic dust which remains in the air for many years because of its small particle size. A ten micron wavelength provides a capability for observing the foregoing aerosols. The aerosols are carried along in the air by the wind and have a velocity equal to the velocity of the wind.

The pulse mode of operation, referred to above for the longer ranges wherein Doppler data is obtained with pulsed laser signal, should be distinguished from the conventional pulsed Doppler radar operating in the frequency range of one to ten gigahertz. The conventional pulsed Doppler radar utilizes a stable oscillator for detecting a succession of coherent echo signals. Such coherence depends of the ratio of wavelength to target size. While the conventional radar utilizes radiation with a wavelength on the order of one-tenth meter, the radiation of the instant radar is much smaller, on the order of ten millionths of a meter. As a result, the conventional pulsed Doppler radar requires pulse to pulse coherence of the carrier with many pulses being required for a Doppler measurement. In contrast, the instant radar provides a Doppler measurement with each echo pulse since there are many Doppler cycles occuring within the duration of each echo pulse and, accordingly, no pulse to pulse coherence is required.

The depth of field and range resolution for short ranges are obtained with the aid of a detector of optical signals such as an amalgam of cadmium and tellurium, the detector having a diameter of magnitude equal to many wavelengths. The combination of a reference signal of the laser with a received optical signal produces a beat frequency signal having a magnitude dependent on the distance from a scatterer to the focus. A strong beat frequency signal is obtained from a scatterer at the focus while a scatterer lying outside of the depth of field produces no more than a weak signal of the detector. The focussed signal produces a plane wavefront which combines with the plane wavefront of the reference signal at the detector to produce the strong signal. The out-of-focus signal has a curved wavefront which produces constructive and destructive interference signals at the face of the detector with a resulting diminished amplitude of signal from the detector. Thereby, the radar is responsive only to signals near the specific range to which the radar is focussed. At long range where the depth of field is large, the range resolution is determined by the width of the transmitted pulse.

The depth of field varies in a quadratic manner with the focal range from the radar. Thus, by way of example, considering the aforementioned ten micron wavelength of the radiation, and utilizing a 12 inch f/2 optical system, at a range of 300 meters the depth of field or range resolution capability is 52 meters. However, at a range ten times as long, namely, 3,000 meters, the depth of field or range resolution capability has increased by a factor of 100 to 5,200 meters. With respect to the foregoing example, a focal range of 2,000 feet (600 meters) would serve as an upper limit to the focussing region with pulse radar operation being utilized at greater ranges, the region of the pulse operation being referred to hereinafter as the pulsing region.

BRIEF DESCRIPTION OF THE DRAWINGS

The aforementioned aspects and other features of the invention are explained in the following decription taken in connection with the accompanying drawings wherein.

DESCRIPTION OF THE PREFERRED EMBODIMENT

Figure 1:
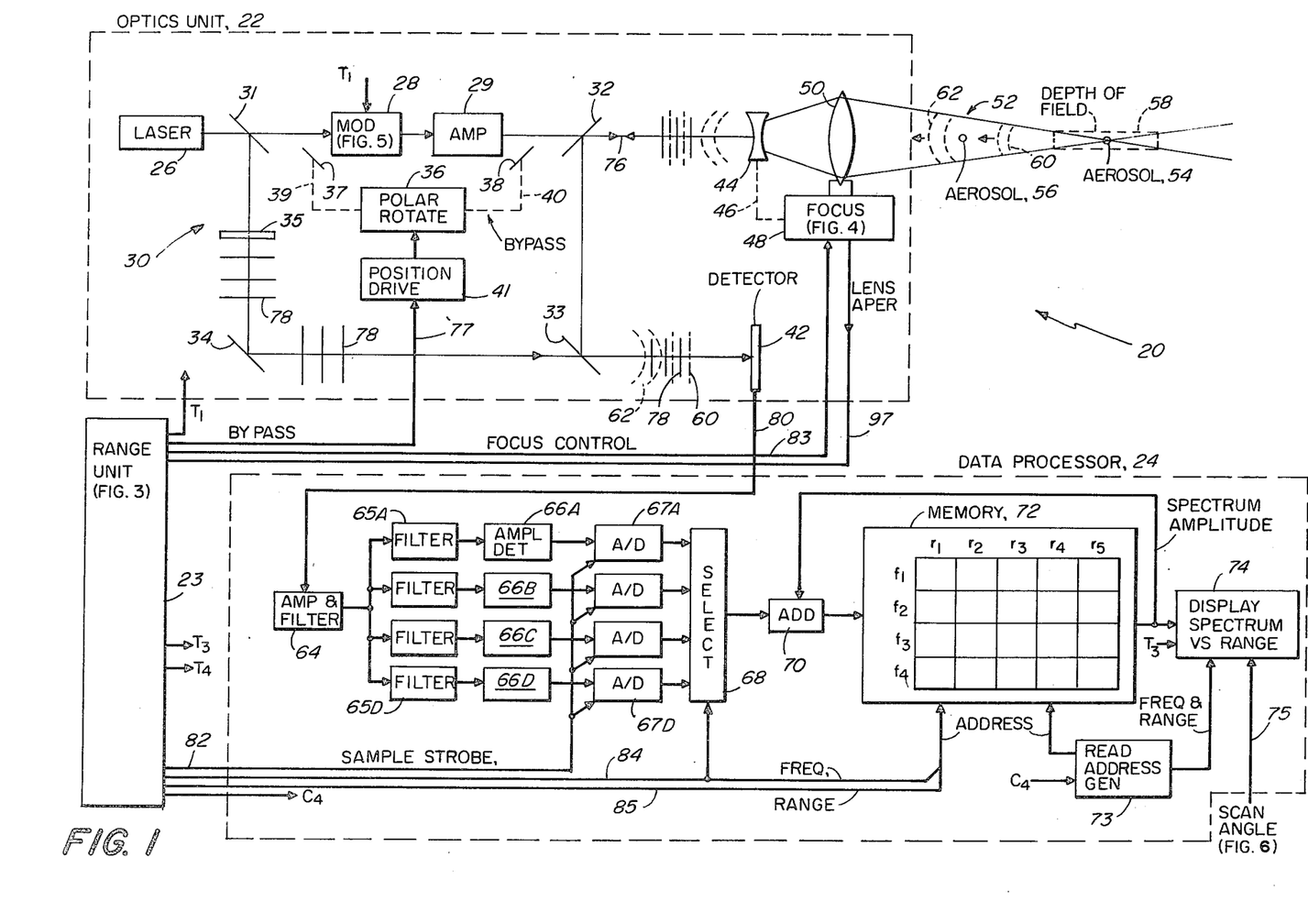
FIG. 1 is a block diagram, partly schematic, of an optical system for use in the invention, the figure also showing timing circuitry, ranging circuitry and Doppler circuitry utilized in the focussing of a lens of the optical system and for processing received optical echoes for obtaining Doppler and ranging data.

Referring now to FIG. 1, there is seen a radar system 20 embodying the invention, the system 20 including an optics unit 22, a range unit 23 and a data processor 24. The optics unit comprises a laser 26, a modulator 28, an amplifier 29, an interferometer 30 comprising three beam splitters 31–33, mirror 34 and a half-wave plate 35, a polarization rotator 36, mirrors 37 and 38 coupled mechanically and optically via lines 39 and 40 respectively to the rotator 36, a drive unit 41 for positioning the mirrors 37 and 38 and the rotator 36, a detector 42, a negative or concave lens 44 mechanically coupled via line 46 to a focussing unit 48 and a positive or convex lens 50 supported by the focussing unit 48. The lens 50 is shown directing a cone of light 52 toward a focal point positioned on an aerosol 54 which reflects radiant energy back toward the lens 50, a second aerosol 56 being shown in an out-of-focus position between the aerosol 54 and the lens 50. A dotted rectangle 58 represents a cylindrical region enclosing the depth of field. Wavefronts 60 and 62 of reflected waves propagate respectively from the aerosols 54 and 56 to the lens 50.

The data processor 24 comprises an amplifier 64, a set of band pass filters 65 of which four filters 65 are shown by way of example with individual ones of the filters 65 being further identified by the suffixes A–D when it is desired to refer to individual ones of the filters 65, amplitude detectors 66A-D, analog-to-digital converters 67A-D and a selector switch 68. Each of the filters 65 with its corresponding detector 66 and converter 67, such as the filter 65A, the detector 66A and the converter 67A, form a signal processing channel for extracting data relative to a specific Doppler spectral region, the signal processing channels being selected sequentially by the switch 68. The data processor 24 further comprises an adder 70, a memory 72, an address generator 73 and a display 74 of Doppler spectral data as a function of the range of scatterers from the lens 50 and also as a function of the scan angle of an optional scanner to be disclosed with reference to FIG. 6, the scan angle being coupled to the display 74 via line 75.

The memory 72 is portrayed as having a set of storage cells arranged in rows and columns, the rows being identified in the figure by the legends f1–f4 for the storage of frequency data, there being four rows shown by way of example with each of the four rows corresponding respectively to the four Doppler signal processing channels. The columns are identified by the legends r1–r5 with each column representing a specific range from the lens 50 for which Doppler data is being obtained. By way of example, five such columns are shown in the figure, it being understood that, in practice, many more of such rows and columns would be utilized. Each cell, therefore, represents a stored value of a spectral region of the Doppler data which is obtained at a specific value of range.

As shown in FIG. 1, the rectangle 58 representing the extent of the depth of field is smaller than the focal range or distance of the aerosol to the lens 50. This is a portrayal of the short range situation wherein the extent of the depth of field is less than a distance to which the optics unit 22 is focussed.

In accordance with the invention, the light beam coupled via line 76 from the interferometer 30 to the lens 44 is pulsed at the longer ranges and operated in continuous fashion at the shorter ranges. For pulsed operation, the modulator 28 is operated by a signal at terminal T1 to modulate the continuous beam of light from the laser 26 resulting in the formation of pulses of radiant energy which are then amplified by the amplifier 29 to a suitable power level for illumination of the scatterers such as the aerosols 54 and 56. In the short range situation wherein cw operation is utilized, the modulator 28 and the amplifier 29 are bypassed by an optical path, or bypass, comprising the mirror 37, the line 39, the rotator 36, the line 40 and the mirror 38. The optical bypass is activated by inserting the mirrors 37 and 38 in position along the optical path from the beam splitter 31 via the modulator 28 to the beam splitter 32. The foregoing insertion of the mirrors 37 and 38 is accomplished by a drive unit 41 which, in reponse to a signal on line 77, physically moves the optical assembly comprising the mirrors 37 and 38 and the polarization rotator 36. Use of the optical bypass prevents overheating of the modulator 28 which might occur under a condition of continuous illumination by the laser 26, the overheating resulting in a variation in the optical properties of the modulator 28. As will be described subsequently with reference to FIG. 5, the modulator 28 introduces a rotation of the polarization vector of the optical signal incident thereupon and, accordingly, the rotator 26 is employed in the optical bypass to impart the same amount of rotation to the polarization vector of the signal on line 39 so that the output optical signal of the interferometer 30 appearing on line 76 has the same polarization whether the optical signal be pulsed or cw. It is noted that the optical bypass also bypasses the amplifier 29 with the result that the cw signal is of lower intensity than that of the pulsed signal. However, a sufficient amount of total energy for a Doppler measurement is produced during the time of a measurement interval due to the continuous nature of the optical signal on line 76 as compared to the relatively short duration, high intensity signal produced by the pulses of the long range situation.

Considering the case of cw operation, the beam of light from the laser 26 propagates along the upper leg of the interferometer 30 via the beam splitters 31 and 32, mirrors 37 and 38 to the lens 44 which diverges or spreads apart the rays of light to illuminate the lens 50. Typically, the lens 50 has a diameter of 12 inches to provide a directive beam of light which is depicted in FIG. 1 by the cone of light 52 directed toward the focal point at the aerosol 54. The beam splitters of the interferometer 30 are constructed of germanium so as to be transparent to the propagation of the light of the laser 26, the beam splitters being coated so that a portion of the light reflects from the surfaces of the beam splitters while the remainder of the light passes directly through the beam splitters. Thus, while light passes from the laser 26 through the beam splitter 31 to the rotator 36, a fraction of the laser light is reflected from the beam splitter 31 and via the mirror 34 through the beam splitter 33 to serve as a reference beam for illuminating the detector 42. The half-wave plate 35 rotates the polarization vector of the reference beam to coincide with the polarization of light reflected from the aerosols. Wavefronts 78 of the reference beam are shown as solid lines in the figure while the wavefronts 60 are shown by a dot-dash representation and the wavefronts 62 are represented by dotted lines. Focussing of the cone of light 52 is accomplished by physically moving the lens 44 relative to a fixed position of the lens 50, the mechanical movement being accomplished by the focussing unit 48 as will be described with reference to FIG. 4. Normals to the wavefront 60 coincide with the rays of the cone of light 52 and are directed via the lenses 50 and 44 to the beam splitter 32, which directs the wavefront 60 via the beam splitter 33 to the detector 42. Both the wavefronts 60 and 78 appear as planar wavefronts at the face of the detector 42. Similarly, the wavefront 62 is also directed by the lens and beam splitters to the detector 42, but with a significant distinction. Since the aerosol 56 is not located at the focal point as is the aerosol 54, normals to the wavefront 62 do not coincide with the rays of the cone of light 52 with the result that the wavefront 62 appearing in front of the detector 42 lies on a curved surface rather than a planar surface.

The planar wavefronts 60 and 78 can interact constructively over the entire face of the detector 42 when the wavefronts are in phase, or destructively when the wavefronts 60 and 78 are out-of-phase. Assuming some motion of the air carrying the aerosol 54, the waves reflected therefrom experience a Doppler shift relative to the waves directed thereto by the lens 50. As a result, the waves represented by the wavefronts 60 and 78 in front of the detector 42 have different frequencies so that the wavefronts 60 and 78 periodically interact constructively and periodically interact destructively to produce a beat frequency signal on line 80 from the detector 42. In the preferred embodiment of the invention, a cadmium-telluride amalgam is utilized for the material of the detector 42, the amalgam producing a voltage in accordance with the intensity of the sum of the wavefronts 60 and 78.

With respect to the wavefront 62 which has a curved surface in front of the detector 42, and wherein the dimensions of the detector 42 are many wavelengths in length, the interaction of the curved wavefront 62 with the planar wavefront 78 results in alternate regions of constructive and destructive interference across the face of the detector 42, this being analogous to the phenomenon of Newton rings observed in the optical studies of thin films. As a result, relatively little signal voltage is produced on line 80 in response to the wavefront 62 while a strong signal is produced in response to the wavefront 60. Thereby, the optics unit 22 is able to distinguish between aerosols lying within the depth of field represented by rectangle 58 and aerosols lying outside the depth of field. Thus, the optics unit 22 produces range discrimination wherein the range cells or range resolution element is equal to the length of the depth of field. The particular value of range to which the optics unit 22 is responsive is set by the focussing unit 48 which positions the lens 44 to produce the desired focal length for the combination of the lens 44 and 50. The beat frequency of the signal on line 80 is equal to the Doppler frequency shift induced on the wave reflected from the aerosol 54 by the wind which blows the aerosol 54, the beat frequency on line 80 therefore being a measure of the wind speed at the focal range of the optics unit 22.

With respect to the foregoing continuous operation, as distinguished from pulsed operation of the optics unit 22, it is noted that any leakage of the transmitted light from the beam splitter 32 to the beam splitter 33 is combined with the light in the bottom leg of the interferometer 30 at the beam splitter 33 to contribute in the formation of the aforementioned reference beam. The Doppler signal on line 80 appears continuously and is coupled via the amplifier 64 to the filters 65. The amplifier 64 includes a band pass filter for extracting and amplifying the beat frequency component of the signal on line 80 for coupling the beat frequency component, this being the Doppler frequency shift, to the filters 65.

The signal on line 80 is a cw or pulsed signal depending on the use of either the rotator 36 or the modulator 28 in producing the signal transmitted by the optics unit 22. In either case, it is noted that the movement of the aerosols in the air result in a continuous Doppler frequency spectrum representing the nominal wind speed. Complete Doppler data, therefore, is obtained by examining not only the mean Doppler frequency representing the nominal wind speed, but, is obtained by examining various portions of the aforementioned continuous spectrum. Accordingly, the filters 65, which may comprise inductor-capacitor tank circuits, have slightly overlapping pass bands with each of the respective pass bands covering respective portions of the Doppler spectrum. In response to the beat frequency signal coupled thereto by the amplifier 64, each of the filters 65 produces an analog signal having an amplitude which is detected by the respective one of the detectors 66. The signals of the detectors 66 are sampled by the converters 67 and, in response to a strobe signal on line 82, are converted to digital signals which are applied to the switch 68. The control signals for operating the system 20 to produce ranging data are provided by the range unit 23, these signals including the strobe signal on line 82, the signal at terminal T1 and the focus control on line 83. Thus, in the short range cw situation, the range of an aerosol such as the aerosol 54 is designated by the focus control signal on line 83, the focussing unit 48 adjusting the position of the lens 44 to focus the cone of light 52 at the range of the aerosol 54. In the long range, pulsed operation of the system 20, the range unit 23 provides the signal at terminal T1 to initiate a pulse of radiant energy, and then at specific instance thereafter initiates each of a sequence of the sampling signals on line 82 for strobing the converters 67 to sample the Doppler data, the times of occurrence of the sampling signal on line 82 determining the ranges of the observed echo signal, this corresponding to the ranging procedure in a conventional pulsed radar.

The times of occurrence of the successive strobing signals on line 82 are set in accordance with the response time of the filters 65. Since the response time of a filter 65 is proportional to the reciprocal of the bandwidth of the filter 65, the repetition frequency of the strobe signals on line 82 is relatively low when narrow band filters 65 are utilized and relatively high when wide band filters 65 are utilized. This is in accordance with the well known theory of Doppler measurement which states that a long measuring interval produces greater resolution of the Doppler spectral lines than does a short measurement interval. At the shorter ranges of the focussing region wherein cw operation is utilized, the sampling rate may be selected independently of the range resolution element since the range resolution is dependent on the depth of field of the optics unit 22. At the longer ranges of the pulsing region wherein the range of each scatterer is dependent of the propagation time of the radiant energy to that scatterer, better range resolution is obtained at the higher sampling rates using wide bandwidth filters 65 with reduced range resolution being obtained at the lower sample rates using narrow bandwidth filters 65.

Figure 2:
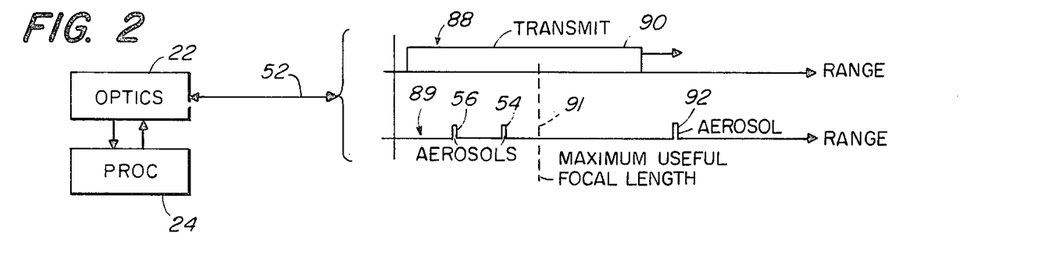
FIG. 2 shows the relative widths of transmitted pulse signals as compared to the focal length or focal range at the upper limit of the focussing region.

By way of example, the Doppler frequency shift for the system 20 is approximately 60 kHz (kilohertz) per foot per second, and in response to aerosol movement, produces values of Doppler frequency shift typically in the range of a few hundred kilohertz to 10 MHz (megahertz). Thus, for a pulse width of 10 microseconds, as produced by the modulator 28, there are at least several cycles of the beat frequency signal on line 80 from the detector 42. Assuming the bandwidth of a filter 65 to be 100 kHz, then a sufficient number of cycles of the Doppler frequency shift in the beat frequency signal on line 80 occur within the response time of the filter 65 such that the filter 65 produces a signal for the detector 66 which is readily detectable. Assuming the aforementioned 100 kHz bandwidth of the filter 65 and a corresponding response time of approximately 10 microseconds, the range resolution element has a value of 1500 meters. The sample strobe signal on line 82 may then occur at a rate of 100 kHz to produce Doppler data of contiguous range resolution elements or, at a lower sampling rate if Doppler data is required only of representative range resolution elements which are spaced apart from each other within a general region of interest.

The range unit 23 produces a sequence of digital numbers on line 84 representing successive ones of the frequency bands of the respective signal channels incident upon the selector switch 68. Line 84 is coupled to the switch 68 for successively selecting individual ones of the signals of the respective converters 67A-D for storage within the memory 72, the line 84 also being coupled to the memory 72 for addressing the corresponding row of the memory 72 for the storing of the frequency data. On line 85, the range unit 23 provides digital signals representing the ranges of the signals sampled by the converters 67, the line 85 being seen to fan into the line 84 at the memory 72 to provide the complete address for the individual cells of the memory 72, the range signal on line 85 identifying the specific column of the memory 72 in which the frequency data is to be stored.

In order to provide increased accuracy to the Doppler spectral measurements, a succession of range sweeps is initiated by the system 20. During the short range portion of each sweep, the range unit 23 provides the aforementioned focus signal on line 83 to the focus unit 48 for continuously varying the range of the focus from the shortest range until the transition range wherein a transition is made from cw operation to pulsed operation. Thereafter, the focus range is held constant, the optical bypass comprising the mirrors 37 and 38 is retracted from the modulator 28, and the range unit 23 provides the signals at terminal T1 for pulsing the modulator 28 to transmit pulses of radiant energy to sweep the range at the longer distances.

Upon the occurrence of the first range sweep, the Doppler data is stored in the memory 72. Upon the occurrence of a subsequent range sweep, the data stored in each memory cell is added via the adder 70 to the next sample of Doppler data designated for that memory cell, the summation of the data samples of the first and second sweeps being entered into that memory cell. In the same manner, for each of the sweeps in a sequence of range sweeps, the data previously stored in a memory cell is added to the corresponding data of the next range sweep so that, after a sequence of, for example, 20 sweeps, the digital numbers stored in the cells of the memory 72 represent an average value of Doppler data as obtained over the set of 20 sweeps. The data of the memory 72 is then coupled to the display 74 which, in the foregoing sample of the 20 sweeps, includes a divider circuit (not shown) for dividing the sums in each of the memory cells by a factor of 20 for displaying the average value of the spectral data as a function of frequency and range. The address generator 73, in response to clock pulses C4 of the range unit 23, provides address signals to the memory 72 and to the display 74 for coupling the data of specific ones of these cells of the memory 72 to the display 74. It is also noted, by way of alternative embodiments, that the set of Doppler spectral processing channels coupled to the switch 68 may be replaced by a fast Fourier transformer (not shown) in which case the signal from the amplifier 64 would be sampled at a rate at least twice the frequency of the Doppler shift (the Nyquist criterion) and applied to the fast Fourier transformer. The output lines from the fast Fourier transformer would then have a set of digital signals similar to those provided by the converters 67 for the spectral data.

Referring also to FIG. 2, the relationship between the pulsing operation of the system 20 at the long range situation is compared to the continuous operation of the system 20 for the short range situation. Two graphs 88 and 89 are provided in registration with each other, the horizontal axis in each graph representing range, or equivalently, the time required for a pulse of radiant energy to propagate through the cone of light 52 to the corresponding range. FIG. 2 shows the optics unit 22 and the data processor 24 of FIG. 1. For simplicity, the cone of light 52 is shown as simply a line in FIG. 2, the graph 88 representing the duration of a transmission of light in the cone of the light 51. For the short range situation, the right hand terminus of a transmitted pulse 90 of the graph 88 is deleted since the light is continuously transmitted. In order to provide as much signal energy as possible for a measurement of the Doppler frequency, the duration of the pulse 90 is made slightly less than the time required to traverse a distance equal to twice the focal range of the short range situation. In the preferred embodiment of the invention, the transition point between the focussing region of the short range situation and the pulsing region of the long range situation occurs at a range equal to approximately 90% of the focal range wherein the depth of field is equal to the focal range. The focal length or focal range of the optics unit 22 at the transition point is indicated by line 91 in FIG. 2. The aerosols 54 and 56 are shown in the graph 89, and are seen to lie at a distance less than the maximum useful focal range. By way of example, an aerosol 92 is shown at a distance substantially greater than the maximum useful focal range. Ranges less than that represented by the line 112 are in the focussing region of the system 20 of FIG. 1 while ranges greater than that represented by the line 112 are in the pulsing region of the system 20.

Figure 3:
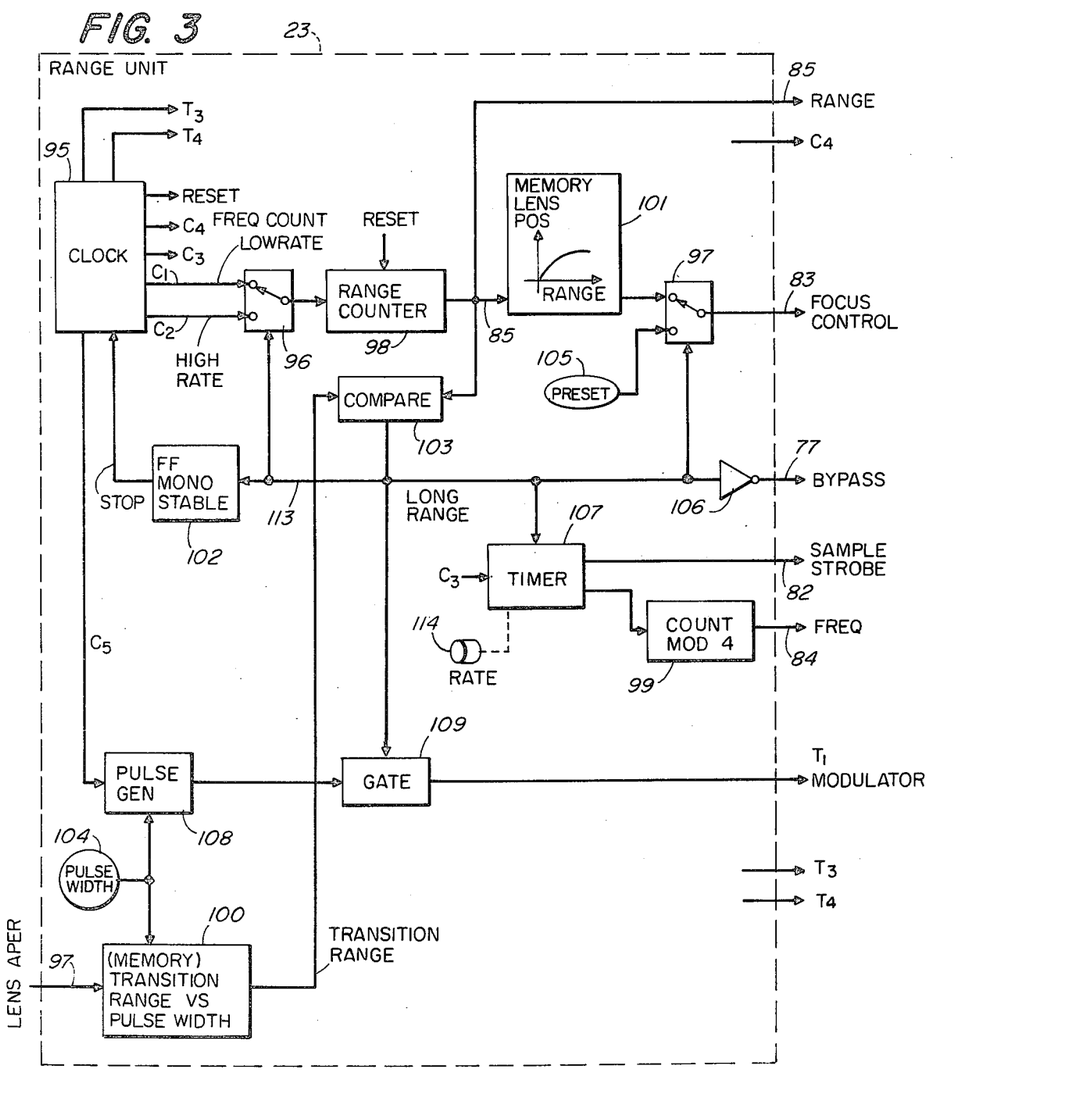
FIG. 3 is a block diagram of a range unit of FIG. 1 which provides a transition between cw and pulsed operation of the system of FIG. 1.

Referring now to FIG. 3, the range unit 23 comprises a clock 95, switches 96 and 97, counters 98 and 99, memories 100 and 101, a monostable flip-flop 102, a comparator 103, encoders 104 and 105, an inverter 106, a timer 107, a pulse generator 108 and a gate 109. The memory 100 is responsive to an aperture signal on line 97 from the focussing unit 48 of FIG. 1 and to a digital signal of the encoder 104 representing the pulse width for providing a range at which the transition takes place between the focussing region and the pulsing region. Also seen in FIG. 3 are the terminals C4 and T1 as well as the lines 85, 83, 77, 82 and 84 coupling the signals referred to previously with reference to FIG. 1.

In operation, the counter 98 serves as a range counter by counting clock pulses, either pulses C1 or C2, coupled via the switch 96 to the counter 98. The comparator 103 compares the digital signal representing the transition range of the memory 100 with the digital signal on line 85 representing the count of the counter 98, the comparator 103 providing a signal on line 113 having a logic state of 1 when the range count on line 85 from the counter 98 is equal to or exceeds the transition range from the memory 100. The signal on line 113 therefore indicates the long range situation in which the system 20 of FIG. 1 operates in the pulse mode, the absence of the signal or logic 0 on line 113 indicating the short range situation wherein the system 20 operates in the cw mode. The signal on line 113 operates the switches 96 and 97 and is also coupled via line 113 from the comparator 103 to the flip-flop 102, the gate 109, the timer 107 and the inverter 106.

The clock 95 resets the range counter 98 at the beginning of each range sweep. Thereupon, the counter 98 counts the C1 clock pulses coupled via the switch 96. The C1 clock pulses occur at a relatively low rate as compared to the C2 clock pulses, the C1 clock pulses being commensurate with the rate at which the lens 44 of FIG. 1 is moved for varying the focal length of the optics unit 22. During the long range situation wherein the focus of the optics unit 22 remains constant, the long range signal on line 113 activates the switch 96 to couple the C2 pulses to the counter 98. The C2 pulses occur at a rate commensurate with the speed of propagation of the radiant energy from the optics unit 22 to the aerosols.

In the short range situation, the terminals of the switch 97 are coupled as shown in the figure so that the output signal of the memory 101 is coupled to line 83. The memory 101 utilizes the numerical value of the range on line 85 as its input address and, in response to that address, provides a digital signal for line 83 designating the spacing between the lens 44 and 50 to produce a focal length equal to the range on line 85. An exemplary graph showing the relationship of lens position versus range is shown in the memory 101. By way of example, the memory 101 may be a read-only-memory in which a specific spacing of the lens is associated with each value of range on line 85. Thereby, during the short range situation, the focal length of the optics unit 22 follows the range ordered by the counter 98.

The clock 95 provides C3 clock pulse signals for the timer 107, the timer 107 producing a succession of the sample strobe signals on line 82 in response to the C3 clock pulse signals. The rate of sample strobe signals may be altered by a knob 114 affixed to the timer 107. The timer 107 also provides clock pulses to the counter 99 which, in accordance with the aforementioned example of the four Doppler spectral data channels coupled to the switch 68 of FIG. 1, counts modulo four. If, for example, eight spectral data channels were utilized, then the counter 99 would count modulo eight. With respect to the foregoing example, of the four spectral data channels, the timer 107 applies a sequence of four clock pulses to the counter 99 which, in turn, counts these pulses to produce a sequence of four digital signals on line 84 which identify sequentially the individual ones of the spectral data channels. The digital signals on line 84 operate the switch 68 of FIG. 1, as was described previously, to select the specific channel, and also serve as a portion of the address of the memory 72 for the identification of the corresponding rows of the memory cells. The clock 95 also provides the C4 clock pulses for the aforementioned operation of the address generator 73 of FIG. 1.

At the conclusion of the portion of the range sweep in the focussing region, activation of the switch 97 by the signal on line 113 couples a preset value of lens position from the encoder 105 to the line 83 in lieu of the position previously presented by the memory 101, the preset position directing the lens 44 to a position which remains fixed during the pulsing region. The preset position provides for a bracketing of the pulsing region by the rectangle 58 of FIG. 1. During the time required for the lens 44 to move to the preset position the flip-flop 102, which is triggered by the signal on line 113, produces a pulse of fixed duration which stops the clock 95 during the duration of the pulse. The duration of the pulse of the flip-flop 102 is sufficient to permit the lens 44 to move to the preset position. The stoppage of the clock 95 stops all of the clock pulses C1-C5 so that there is no counting of range by the counter 98, there are no strobing signals on line 82 for sampling data, and the count on line 84 also remains constant during the stoppage of the clock 95. For operation in the focussing region, the logic state of 0 on line 113 is converted by the converter 106, the logic state of 1 on line 77 for activating the drive unit 41 of FIG. 1 to position the bypass mirrors 37 and 38 for guiding the laser light along the bypass path around the modulator 28 and the amplifier 29. For operation in the pulsing region, the logic state of 1 on line 113 is converted by the inverter 106 to a logic state of 0 so that the bypass mirrors 37 and 38 are retracted from the optical path of the modulator 28. The duration of the pulse produced by the flip-flop 102 is sufficient to allow for the positioning of the optical bypass so that the clock 95 is stopped during the positioning of the bypass.

The clock 95 provides C5 clock pulses which trigger the generator 108 to produce pulses which are coupled via the gate 109 to the T1 terminal for operating the modulator 28 of FIG. 1. Since the gate 109 is activated by the long range signal on line 113, the modulator 28 is activated only for operation within the pulsing regions, there being no pulses coupled via the gate 109 to the modulator 28 during the operation in the focussing region. The digital signal representing the pulse width, as provided by the encoder 104, is applied to the generator 108 for controlling the duration of the pulse of radiant energy transmitted by the optics unit 22, and also serve as a partial address for the memory 100.

The memory 100 comprises several sections, there being one section for each value of the lens aperture identified by the signal on line 97. The signal on line 97 also serves as a portion of the address of the memory 100 for selecting the specific section of the memory 100. Each section of the memory 100 is in the form preferably of a read-only memory in which one value of transition range is associated with each value of pulse width.

Figure 4:
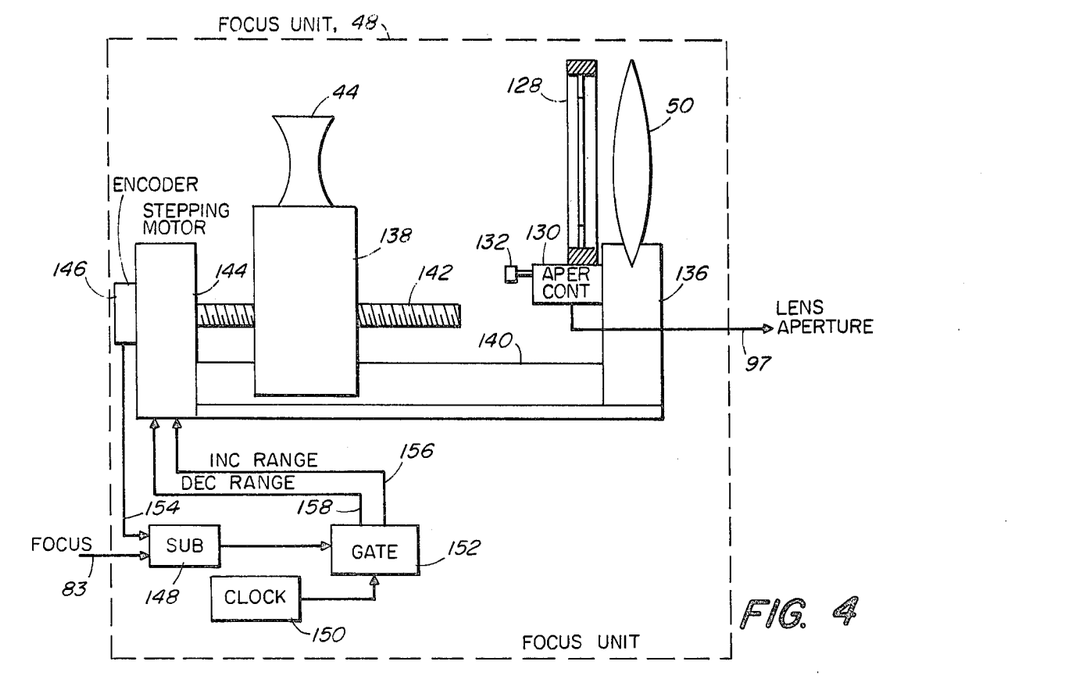
FIG. 4 shows a diagram of the focussing unit of FIG. 1 including lenses of the optical system utilized in producing the focussed radar beam.

Referring now to FIG. 4, the focussing unit 48 is seen to comprise an iris 128 positioned adjacent the convex lens 50 (seen also in FIG. 1) for varying the lens aperture, the iris 128 being located upon an aperture control unit 130 for adjusting the iris in response to the turning of a knob 132 on the control unit 130. The control unit 130 provides a digital number on line 97 indicating the diameter of the lens aperture. The focussing unit 48 also comprises a fixed support 136 for positioning the control unit 130 and the convex lens 50, and a sliding support 138 for positioning the concave lens 44 (seen also in FIG. 1). The sliding support 138 slides along a rail 140 affixed to the support 136, the sliding being accomplished by a worm drive 142 activated by a stepping motor 144 which is also affixed to the rail 140. The focussing unit 48 also comprises an encoder 146, a subtractor 148, a clock 150 and a gate 152. The encoder 146 is driven by the motor 144 and counts fractional rotations thereof to produce a digital number on line 154 representing the position of the support 138 of the rail 140, this being equivalent to the position of the lens 44 relative to the convex lens 50. The input focus signal on line 83, also seen in FIG. 1, is applied to the subtractor 148 which subtracts the digital number on line 154 from the digital number on line 83. When the output signal of the subtractor 148 is positive, this indicating that the signal on line 83 is greater than the signal on line 154, the gate 152 applies the clock pulses to line 156 for increasing the range. When the signal produced by the subtractor 148 is negative, this indicating that the signal on line 83 is less than the signal on line 154, the gate 152 couples the clock pulses to line 158 for decreasing the range. The gate 152 admits no clock pulses when the numbers of the lines 83 and 154 are equal, this producing a zero signal from the subtractor 148. In this way, the focal range is selected in accordance with the magnitude of the digital number on line 83 which, as noted hereinabove with reference to FIG. 3, is produced by the memory 101 in accordance with the desired range.

Figure 5:
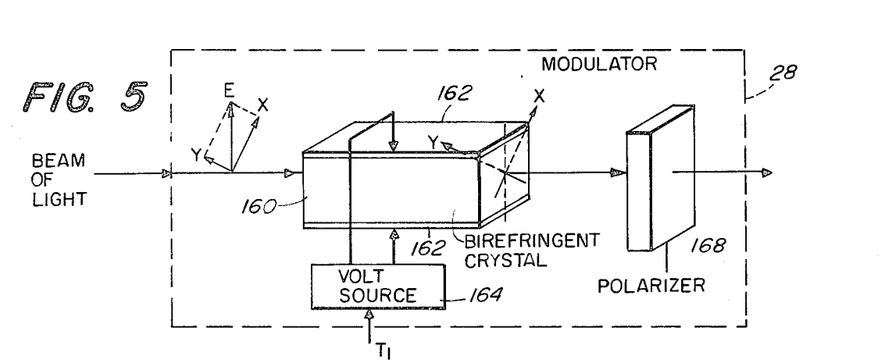
FIG. 5 is a block diagram of a modulator of FIG. 1.

Referring now to FIG. 5, the modulator 28, previously seen in FIG. 1, comprises a crystal 160 of cadmium telluride positioned between a pair of electrodes 162 coupled to a source 164 of voltage whereby an electric field may be impressed in a plane traverse to the longitudinal axis of the crystal 160. With reference to a coordinate system 166, the electric field is impressed at 45 degrees between the X and Y axes. In the absence of the electric field, a beam of light having its electric vector oriented along the Y axis propagates along the longitudinal axis of the crystal 160 with the same speed as a beam of light having its electric field oriented along the X axis. In the presence of the electric field, the speed of propagation of a light beam having its electric vector oriented along the Y axis differs from the speed of propagation of a beam of light having its electric vector oriented along the X axis. The crystal 160 is positioned such that the electric vector of the beam of light from the laser 26 of FIG. 1 is oriented in the transverse plane at 45 degrees relative to the X axis. Thereby, in the absence of the electric field, the direction of polarization of the light beam remains invariant during a passage of the light through the crystal 160. When the electric field is impressed across the crystal 160, the electric vector of the light is rotated about the longitudinal axis of the crystal 160 during a passage of the light through the crystal.

The modulator 28 also comprises a polarizer 168 having its transmission plane oriented perpendicularly to the electric vector of the beam of light incident upon the crystal 160. In the absence of the impressed electric field across the crystal 160, the electric vector maintains its orientation as the beam of light propagates through the crystal 160 so that the beam of light reaches the polarizer 168 in a cross-polarized orientation and is stopped by the polarizer 168 with the result that no light exits from the modulator 28. The longitudinal dimension of the crystal 160 is selected so that, in the presence of the electric field across the crystal 160, the electric vector is rotated 90° to line up with the transmission plane of the polarizier 168 so that the light exits from the modulator 28. The voltage source 164 is activated by the pulse signal at terminal T1 described previously with reference to the range unit 23 of FIGS. 1 and 3. Thereby, in the absence of the pulse signal at terminal T1, the modulator 28 shuts off a beam of light while, in the presence of the pulse signal at terminal T1, the modulator 28 is transparent to the propagation of the beam of light.

Figure 6:
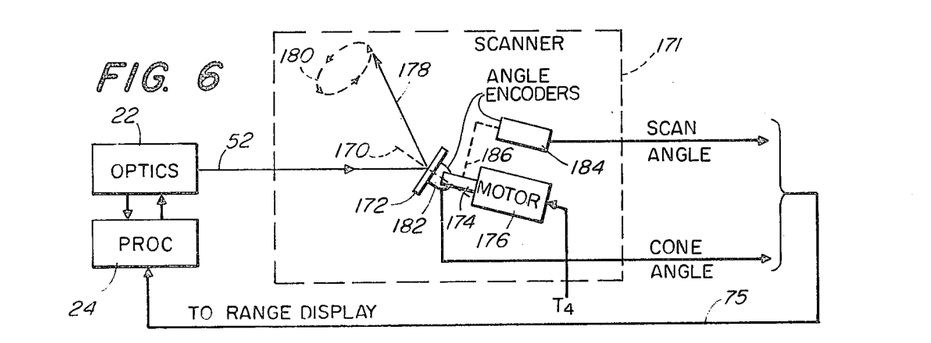
FIG. 6 is a diagram of an optical scanner for use with the optical system of FIG. 1 to produce a scanning optical beam.

Referring now to FIG. 6, there is shown an additional feature of the invention wherein a scanner 171 may be positioned within the cone of light 52 of FIG. 1 for directing the rays of light to scan in a conical scan format. As shown in FIG. 6, the cone of light 52, here represented by simply a line, is directed at an angle to the normal 170 of a scanning mirror 172 with the mirror 172 being rotated about an axis of rotation which is angled relative to the normal 170. The axis of rotation coincides with a shaft 174 of a motor 176, the shaft 174 being pivotably connected to the mirror 172 whereby the orientation of the normal 170 relative to the shaft 174 may be selected to produce a desired cone angle for the scan. The motor 176 rotates the mirror 172 so that a beam 178 of light reflected by the mirror 172 moves in a circular fashion as indicated by the arrows 180.

An encoder 182 positioned at the pivot between the mirror 172 and the shaft 174 provides the cone angle of the scan pattern. An encoder 184 mechanically coupled via line 186 to the shaft 174 provides the instantaneous scan angle, namely, the amount of rotation of the beam 178 about the conical scan. The scan angle and cone angle of the conical scan are coupled via line 75 to the processor 24 which, as seen in FIG. 1, utilizes the data on line 75 for providing a display of the range of a scatterer versus a scanning angle at which the scatterer is observed.

It is understood that the above-described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A radar system comprising:
   means for generating a beam of radiant energy;
   an optical system coupled to said beam for producing a focus, said optical system directing said radiant energy to a scatterer of radiant energy;
   means for receiving radiant energy reflected by said scatterer;
   means coupled to said optical system for varying said focus to produce a focal range equal to the range of said scatterer from said optical system;
   means for modulating said beam of radiant energy;
   means coupled to said optical system to control said modulating means for providing a pulse of radiant energy having a duration less than the time of propagation of said radiant energy through a distance equal to twice the focal range of said optical system, said control means including means for initiating said modulating of said beam at ranges greater than a predetermined range and means coupled to said focus varying means for initiating said varying of said focus at ranges less than said predetermined range; and
   means coupled between said optical system and said receiving means for measuring a component of the velocity of said scatterer.

2. A system according to claim 1 wherein said receiving means includes means for combining said received radiant energy with a reference beam of said optical system, and means for extracting a Doppler frequency signal from said combination of received radiant energy with said reference beam.

3. A system according to claim 2 wherein said velocity measuring means comprises means for measuring the magnitude of the Doppler spectral components in a plurality of frequency bands.

4. A system according to claim 3 further comprising means optically coupled to said optical system for scanning a beam of said radiant energy, said scanning means including means for signaling an angular orientation of said scanned beam of radiant energy, and means coupled to said scanning means and to said focus varying means for displaying focal range as a function of beam orientation.

5. A system according to claim 4 wherein said focus varying means comprises a memory storing lens data as a function of range.

6. A radar system comprising:
   means for generating a beam of radiant energy, said generating means including means for modulating said beam to produce a pulse of radiant energy;
   an optical system responsive to said beam for producing a focus, said optical system directing said radiant energy toward scatterers of radiant energy;
   means for receiving radiant energy reflected by said scatterers;
   means coupled to said optical system for varying the focus to provide a focal length equal to the range of one of said scatterers from said optical system, the depth of field varying with said focal length;
   means coupled between said optical system and said receiving means for measuring a component of the velocities of said scatterers;
   means coupled to said modulating means for activating said modulating means at ranges greater than a transition range at which said depth of field is approximately equal to a range cell provided by said pulse of radiant energy; and wherein
   the duration of said pulse of said radiant energy is equal to twice the time required for radiant energy to propagate through the distance of a range cell at a range approximately equal to the focal length of said focus.

7. A system according to claim 6 wherein said receiving means includes means for combining received energy with a reference beam of said optical system, and means responsive to said combination of received energy and reference beam to extract a Doppler frequency signal thereof.

8. A system according to claim 7 wherein said velocity measuring means includes comb filter means for extracting components of the Doppler spectrum.

9. A system according to claim 7 further comprising means optically coupled to said optical system for scanning a beam of radiant energy in a conical scan, said system further comprising means coupled to said Doppler extracting means for measuring the range of a scatterer illuminated by said scanning means, and means coupled to said scanning means and to said range measuring means for displaying the range of said scatterer as a function of the orientation of a scan beam of radiant energy.

10. A radar system comprising:
    means for generating a beam of radiant energy, said generating means including means for modulating said beam to produce a pulse of radiant energy;
    an optical system coupled to said generating means for focussing said radiant energy at a focus, said optical system directing said radiant energy toward scatterers of radiant energy;
    means coupled to said generating means for receiving radiant energy reflected by said scatterers, said receiving means including means for measuring frequencies present in said reflected energy;
    said optical system including an aperture for varying a depth of field about said focus;
    said modulating means including means for selecting a width of said pulse of radiant energy; and
    means coupled between said generating means and said optical system for activating said modulating means to provide a duration of said pulse of radiant energy which is less than twice the time of propagation of said radiant energy through a distance approximately equal to said depth of field.

11. A system according to claim 10 wherein said activation of said modulating means occurs at a transition range to which said radiant energy is focussed, said generating means providing a continuous wave of said radiant energy at ranges less than said transition range, and wherein said activating means comprises a memory for storing said transition range as a function of said pulse width and said lens aperture.

12. A system according to claim 11 wherein said generating means further comprises means coupled to said activating means for optically bypassing said modulating means at ranges less than said transition range.

13. in combination:
means for generating a beam of radiant energy, said generating means including means for modulating said beam to produce pulses of said radiant energy;
an optical system coupled to said generating means for focussing said radiant energy toward a focus, said optical system directing said radiant energy to a scatterer of said radiant energy;
means coupled to said generating means and said optical system for extracting spectral data from radiant energy reflected from said scatterer;
timing means producing timing signals at a first rate and a second rate, said first rate being slower than said second rate;
a range counter selectively coupled to said first and second timing signals for producing a range count;
means coupled between said counter and said optical system for adjusting said optical system to locate said focus at a distance proportional to said range count, the rate of location of said focus being proportional to said first rate of said timing signals; and
means coupled to said counter for activating said modulating means upon the attainment of a predetermined count of said counter, said activating means decoupling said optical system from said counter and coupling said counter to said second rate of timing signals for counting a ranging interval of said pulse of radiant energy.

* * * * *